(12) United States Patent
Nakamoto et al.

(10) Patent No.: US 8,502,935 B2
(45) Date of Patent: Aug. 6, 2013

(54) LIQUID CRYSTAL DISPLAY DEVICE COMPRISING A LIGHT GUIDE PLATE WITH A LIGHT RADIATION PORTION AND A LIGHT INCIDENT PORTION JOINED BY A JOINT SURFACE AND HAVING AN INCLINED SURFACE AND PROJECTING PORTIONS

(75) Inventors: Hiroshi Nakamoto, Chiba (JP); Yoshikazu Tanabe, Ichihara (JP); Kouji Fujisawa, Mobara (JP)

(73) Assignees: Hitachi Displays, Ltd., Chiba-ken (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 375 days.

(21) Appl. No.: 12/222,576

(22) Filed: Aug. 12, 2008

(65) Prior Publication Data
US 2009/0059127 A1 Mar. 5, 2009

(30) Foreign Application Priority Data
Sep. 3, 2007 (JP) ................................. 2007-227248

(51) Int. Cl.
*G02F 1/335* (2006.01)
*F21V 7/04* (2006.01)

(52) U.S. Cl.
USPC .............................. 349/65; 362/608; 362/621

(58) Field of Classification Search
USPC ..................... 349/61–65; 362/608, 621–622, 362/97.2–97.4
See application file for complete search history.

(56) References Cited

U.S. PATENT DOCUMENTS
2004/0109306 A1* 6/2004 Lee .................................. 362/31
2006/0082884 A1* 4/2006 Feng et al. ..................... 359/569

FOREIGN PATENT DOCUMENTS
JP 08-146229 6/1996
JP 2004-012747 1/2004

* cited by examiner

*Primary Examiner* — Paul Lee
(74) *Attorney, Agent, or Firm* — Stites & Harbison PLLC; Juan Carlos A. Marquez, Esq.; Stephen J. Weyer, Esq.

(57) ABSTRACT

In a backlight which arranges light emitting diodes on a side surface of a light guide plate, even when the light guide plate is made thin by further reducing a thickness of the light guide plate and the light emitting diodes having a thickness larger than the thickness of the light guide plate are used, it is possible to manufacture the light guide plate with high accuracy in a short time. In a liquid crystal display device having a backlight which radiates light to a liquid crystal panel, LEDs are mounted on the light guide plate formed on the backlight as a light emitting element, a light radiation portion of the light guide plate is formed by molding by applying pressure and heat to a sheet-shaped resin, and a light incident portion of the light guide plate is formed by injection molding.

15 Claims, 10 Drawing Sheets

LIQUID CRYSTAL DISPLAY DEVICE COMPRISING A LIGHT GUIDE PLATE WITH A LIGHT RADIATION PORTION AND A LIGHT INCIDENT PORTION JOINED BY A JOINT SURFACE AND HAVING AN INCLINED SURFACE AND PROJECTING PORTIONS

BACKGROUND OF THE INVENTION

1. Field of the Invention

The present invention relates to a light source of a non-self-luminous display device, and more particularly to a liquid crystal display device having a backlight which includes a light guide plate and uses an LED as a light source.

2. Background Art

Recently, the liquid crystal display device has been popularly used as a display device. Particularly, the liquid crystal display device is used as a display part of portable equipment because the liquid crystal display device is thin and light-weighted, and consumes small electric power.

However, the liquid crystal display device is not self-luminous and hence, the liquid crystal display device requires a lighting means. In general, as a lighting device which is used for the liquid crystal display device, a planar lighting device referred to as a backlight is popularly used. Conventionally, although a cold cathode fluorescent tube has been used as a light emitting element (also referred to as a light source) of the backlight, an LED (light emitting diode) has been also recently used as the light emitting element.

As a thin backlight, there has been known a side-light-type backlight which includes a light emitting element on a side surface thereof. The side-light-type backlight includes a plate-shaped light guide plate. A material of the light guide plate is a light transmitting resin or the like, and light incident on the light guide plate from the light emitting element propagates in the inside of the light guide plate. A reflection/scattering member such as grooves, projections or a printed material is formed on the light guide plate, and the light which propagates in the inside of the light guide plate due to such a reflection/scattering member is directed and radiated toward a liquid-crystal-display-device side.

When LEDs are used as a light emitting element, there arises a drawback that a thickness of the LEDs is larger than a thickness of the light guide plate. Accordingly, as disclosed in JP-A-2004-12747, for example, there has been proposed the constitution of a light guide plate which changes a thickness thereof in two stages, wherein a thickness of the light guide plate is made large at a light incident surface on which light is incident from a light source, and the thickness of the light guide plate at a light radiation surface is set smaller than the thickness of the light guide plate at the light incident surface thus forming an inclined surface extending toward the light radiation surface from the light incident surface. However, JP-A-2004-12747 fails to disclose a manufacturing method of the light guide plate when the thickness of the light guide plate at the light radiation surface is further reduced.

On the other hand, JP-A-08-146229 discloses a technique which integrally forms a reflection sheet at the time of forming a light guide plate by injection molding. However, JP-A-08-146229 merely discloses the reflection sheet which is integrally formed with the light guide plate, and fails to disclose a technique which forms the light guide plate using a sheet-shaped resin.

SUMMARY OF THE INVENTION

The further reduction of the thickness of the light guide plate makes the manufacture of the light guide plate by injection molding difficult. Particularly, it is difficult to manufacture the light guide plate by injection molding using the resin within a manufacturing time suitable for mass production and hence, it has been impossible to acquire by molding the light guide plate which exhibits stable quality and has a small thickness.

The present invention has been made to overcome the above-mentioned drawbacks, and it is an object of the present invention to provide a liquid crystal display device including a display panel, a backlight which radiates light to the display panel, a light emitting element which is mounted on the backlight, and a light guide plate on which light from the light emitting element is incident, wherein the light emitting element is mounted on a side surface of the light guide plate, and the light guide plate is formed such that a light radiation portion of the light guide plate is prepared using a sheet-shaped resin, the light radiation portion is formed by molding by applying pressure to the sheet-shaped resin, and a light incident portion of the light guide plate is adhered to the light radiation portion by injection molding.

By forming the light radiation portion of the light guide plate by forming the thin sheet-shaped resin, it is possible to manufacture the thin light guide plate having stable quality in a short time.

DETAIL DESCRIPTION OF THE
EMBODIMENTS

In a liquid crystal display device including a liquid crystal panel and a planar lighting device which radiates light to the liquid crystal panel, the planar lighting device includes a light guide plate having a light radiation surface and a bottom surface which faces the light radiation surface in an opposed manner. Further, the light guide plate includes side surfaces which intersect with the light radiation surface and the bottom surface. A plurality of LEDs is arranged along the first side surface of the light guide plate. The first side surface forms a light incident surface of the light guide plate by allowing light from the LEDs to be incident on the light guide plate from the first side surface. The light incident on the light guide plate is directed toward a light-radiation-surface side by a scattering member mounted on the bottom surface of the light guide plate, and is radiated from the light radiation source. The light guide plate includes an inclined portion extending toward a light radiation surface side thereof from a light incident surface side thereof. The inclined portion is formed by injection molding and is fused to the light radiation surface. The light radiation surface is formed on the light guide plate by pressurizing and heating a sheet-shaped resin and by transferring a shape of a mold to the sheet-shaped resin.

Figure 1:
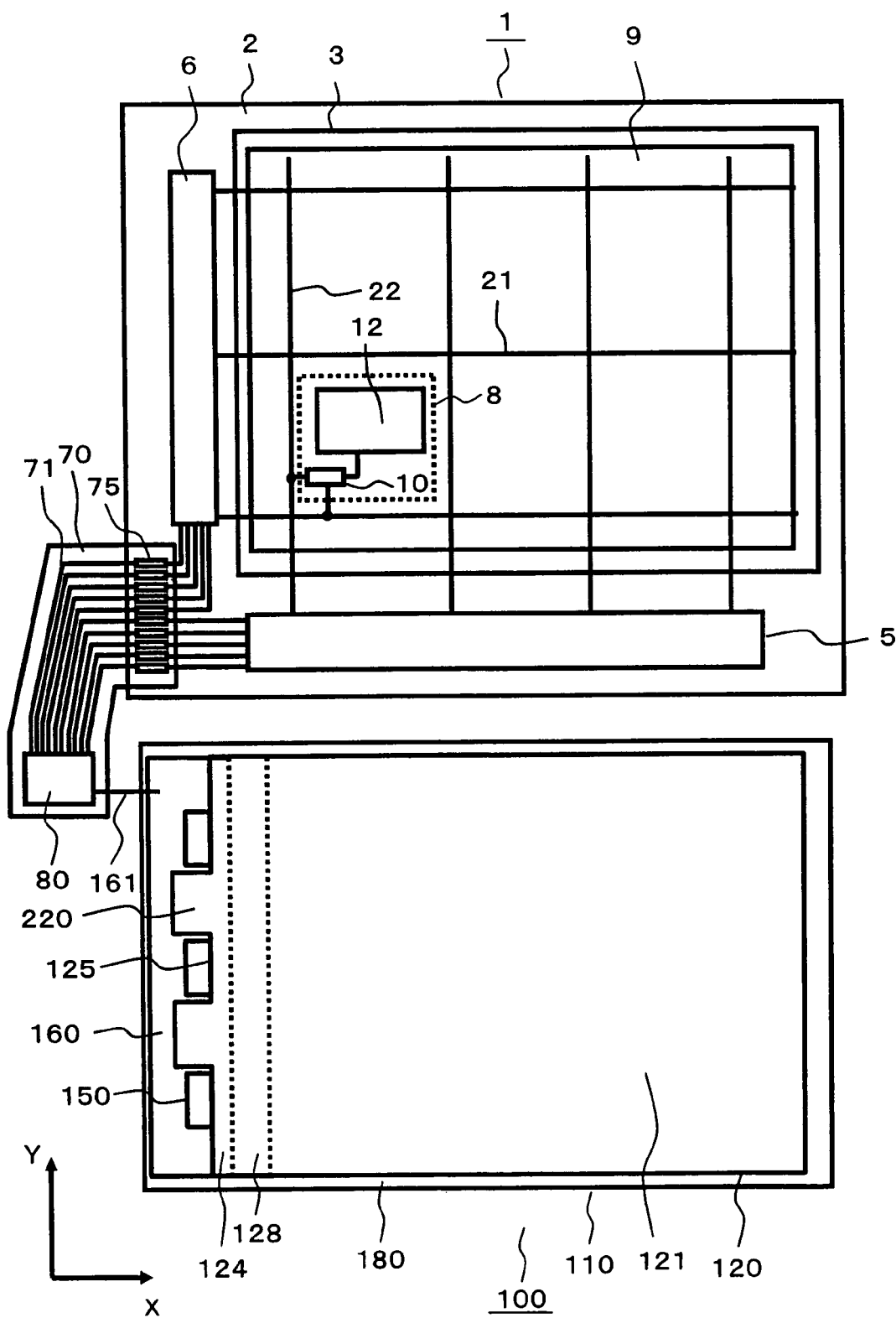
FIG. 1 is a block diagram showing the schematic constitution of a liquid crystal display device of an embodiment according to the present invention.

FIG. 1 is a plan view showing a liquid crystal display device 100 according to the present invention. The liquid crystal display device 100 is constituted of a liquid crystal panel 1, a backlight 110 and a control circuit 80. Signals and power source voltages necessary for a display of the liquid crystal display device 100 are supplied from the control circuit 80. The control circuit 80 is mounted on a flexible printed circuit board 70, and signals are transmitted to the liquid crystal panel 1 via lines 71 and terminals 75.

The backlight 110 is constituted of a light guide plate 120, LEDs 150 and a housing casing 180. The backlight 110 is provided for radiating light to the liquid crystal panel 1. The liquid crystal panel 1 performs a display by controlling a transmission quantity or a reflection quantity of light radiated from the backlight 110. Here, the backlight 110 is mounted on a back-surface side or a front-surface side of the liquid crystal panel 1 in a stacked manner as viewed from a viewer. However, in FIG. 1, to facilitate the understanding of the constitution of the liquid crystal display device, the backlight 110 is shown in a state that the backlight 110 is arranged parallel to the liquid crystal panel 1.

The light guide plate 120 has a substantially rectangular shape, and the LEDs 150 are arranged on the side surface thereof. Numeral 160 indicates a flexible printed circuit board which electrically connects the plurality of LEDs 150 with each other. The flexible printed circuit board 160 and the control circuit 80 are electrically connected with each other by lines 161.

A side surface 125 on which the LEDs 150 are arranged is referred to as a light incident surface or a light entering surface, and the light is incident on the light guide plate 120 from the light incident surface 125. The light incident on the light guide plate 120 from the light incident surface 125 is radiated from a light radiation surface 121. An inclined portion 128 is formed between the light incident surface 125 and the light radiation surface 121 for guiding the light incident from the light incident surface 125 to the light radiation surface 121. A light incident portion 124 is formed of the light incident surface 125 and the inclined portion 128, and the light incident portion 124 is provided for efficiently transmitting the light emitted from the LED 150 to the light radiation surface. The light incident portion 124 is explained in detail later.

Next, the liquid crystal panel 1 is explained. The liquid crystal panel 1 includes two substrates consisting of a TFT substrate 2 and a color filter substrate 3 which overlap with each other, and the liquid crystal composition sandwiched between these two substrates. Pixel portions 8 are arranged on the TFT substrate 2, and each pixel portion 8 includes a pixel electrode 12. Here, although the liquid crystal panel 1 includes a large number of pixel portions 8 arranged in a matrix array, to prevent the drawing from becoming complicated, only one pixel portion 8 is shown in FIG. 1. The pixel portions 8 arranged in a matrix array form a display region 9, each pixel portion 8 plays a role of a pixel of a displayed image, and an image is displayed in the display region 9.

In FIG. 1, gate signal lines (also referred to as scanning lines) 21 which extend in the x direction and are arranged parallel to each other in the y direction in the drawing, and drain signal lines (also referred to as video signal lines) 22 which extend in the y direction and are arranged parallel to each other in the x direction in the drawing are provided, wherein the gate signal lines 21 and the drain signal lines 22 intersect with each other. Further, each pixel portion 8 is formed in a region surrounded by the gate signal lines 21 and the drain signal lines 22.

A switching element 10 is provided to the pixel portion 8. A control signal is supplied to the switching element 10 via the gate signal line 21 so as to control an ON/OFF state of the switching element 10. When the switching element 10 is turned on, a video signal transmitted via the drain signal line 22 is supplied to the pixel electrode 12.

The drain signal lines 22 are connected to a drive circuit 5, and the video signals are outputted to the drain signal lines 22 from the drive circuit 5. The gate signal lines 21 are connected to a drive circuit 6, and the control signals are outputted to the gate signal lines 21 from the drive circuit 6. Here, the gate signal lines 21, the drain signal lines 22, the drive circuit 5 and the drive circuit 6 are formed on the same TFT substrate 2. Further, in addition to the drive circuit 5 and the drive circuit 6, the control circuit 80 can be formed on one semiconductor chip.

Figure 2A:
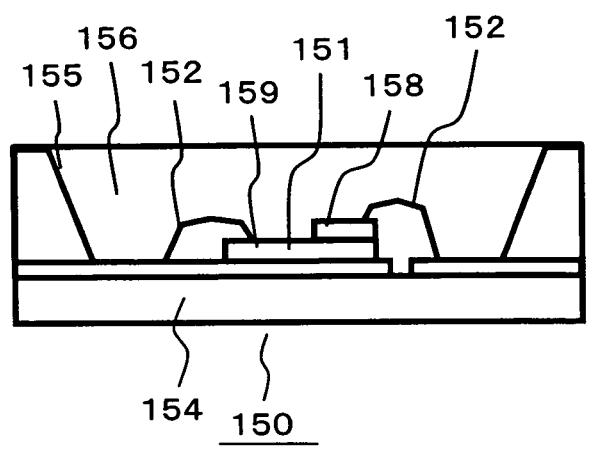
FIG. 2A and FIG. 2B are schematic views showing a light emitting diode of the liquid crystal display device of the embodiment according to the present invention.
Figure 2B:
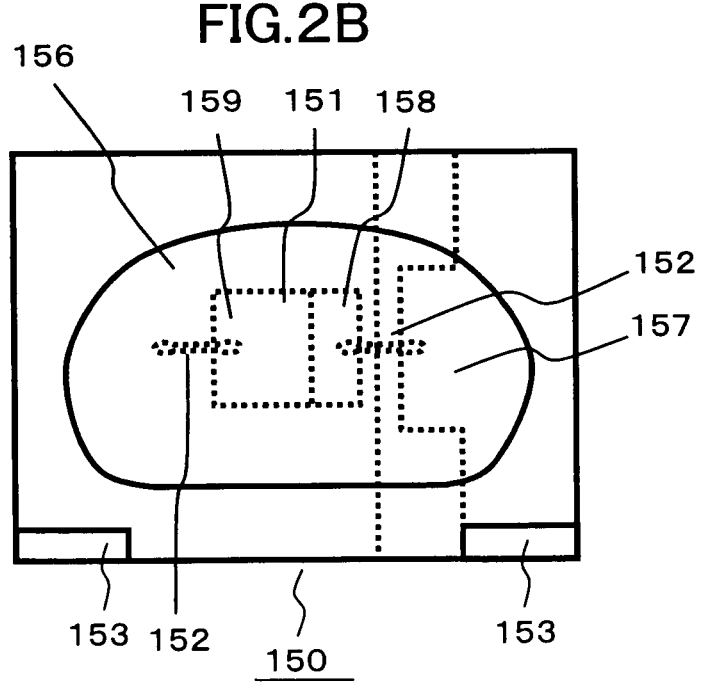

Next, FIG. 2A and FIG. 2B are schematic views showing the LED 150 which constitutes a light emitting element, wherein FIG. 2A is a schematic cross-sectional view of the LED 150, and FIG. 2B is a front view of the LED 150 as viewed from a light-emission side.

The LED 150 is configured such that an LED chip 151 which constitutes a light emission portion is mounted on a chip substrate 154. The LED chip 151 has a pn junction and, when a voltage is applied to the pn junction, the LED chip 151 emits light at a specified wavelength. A p electrode (anode) 158 is formed on a p-type semiconductor layer which forms the pn junction, and an n electrode (cathode) 159 is formed on an n-type semiconductor layer which forms the pn junction. Wires 152 are respectively connected to the p electrode 158 and the n electrode 159. Chip terminals 153 are provided for connecting the LED 150 to an external portion, and the chip terminals 153 are electrically connected with the p electrode 158 and the n electrode 159 using the wires 152.

A fluorescent light emission part 156 may be arranged on a light-radiation-surface side of the LED chip 151. The fluorescent light emission part 156 has a function of converting a wavelength of light emitted from the LED chip 151. Numeral 155 indicates a reflection portion, and the reflection portion 155 reflects light toward a front side. A light emission surface 157 from which light is emitted is formed on a front surface side of the LED 150.

Figure 3A:
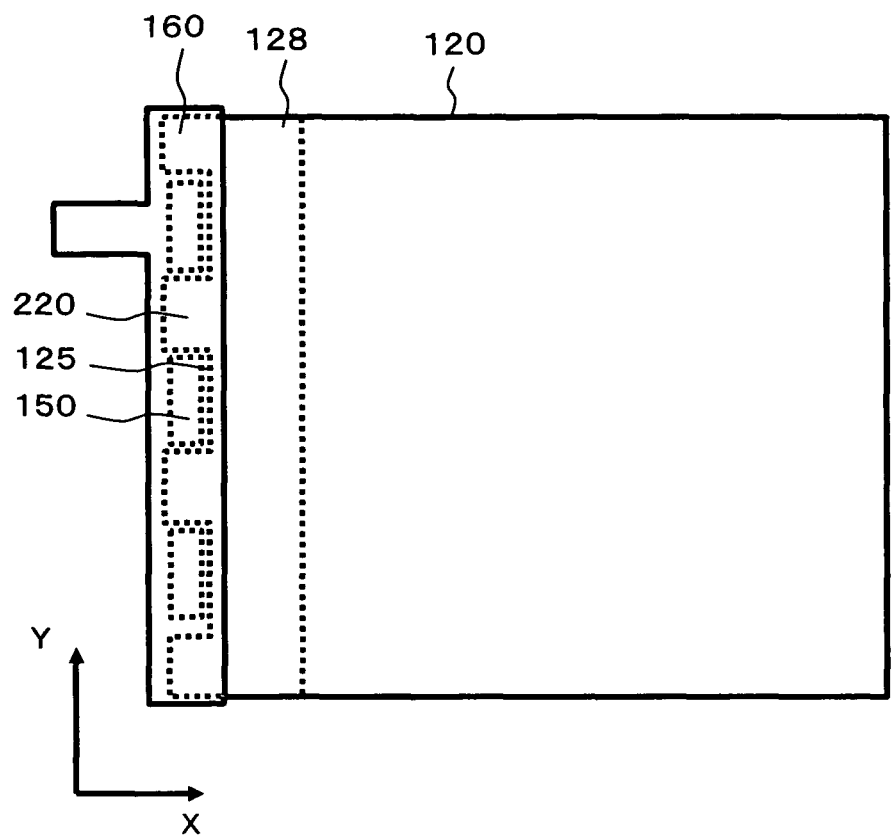
FIG. 3A and FIG. 3B are schematic views showing a light guide plate of the liquid crystal display device of the embodiment according to the present invention.
Figure 3B:
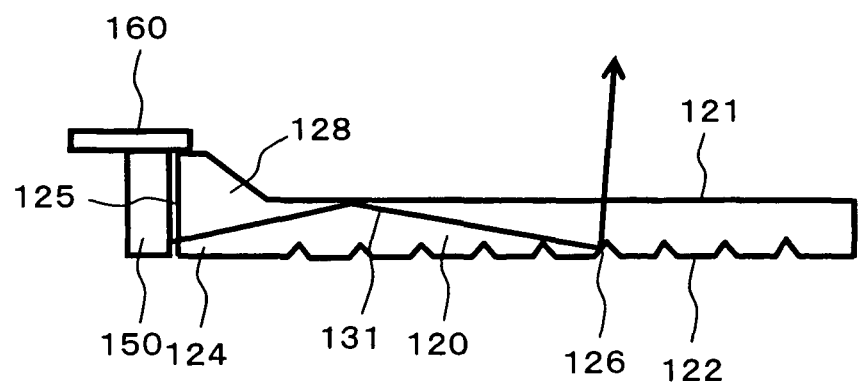

Next, FIG. 3A is a schematic plan view of the light guide plate 120, and FIG. 3B is a schematic side view of the light guide plate 120. As shown in FIG. 3A, the light guide plate 120 is formed into an approximately rectangular shape and, as shown in FIG. 3B, the light guide plate 120 includes an upper surface (also referred to as a light radiation surface) 121 and a lower surface 122. The light guide plate 120 is made of a material such as an acrylic resin or a polycarbonate which allows light to pass therethrough. The light guide plate 120 is formed into a plate shape, and a thickness of the light guide plate 120 is set to 0.1 mm to 1.0 mm.

In FIG. 3B, although a cross section of the light guide plate 120 has an approximately rectangular shape, the inclined portion 128 is formed toward the light radiation surface 121 from the light incident surface 125. The inclined portion 128 is effective when a thickness of the LED 150 is larger than a thickness of the light radiation surface 121 of the light guide plate 120.

In FIG. 3A and FIG. 3B, the positional relationship between the light guide plate 120, the LED 150 and the flexible printed circuit board 160 is shown. On at least one side of the light guide plate 120, the light incident surface 125 is arranged and, in the vicinity of the light incident surface 125, a plurality of LEDs 150 is arranged. The LEDs 150 are arranged below the flexible printed circuit board 160 and along the light incident surface 125.

An adhesive sheet (not shown in the drawing) is arranged on a light-guide-plate-120 side of the flexible printed circuit board 160. By adhering and fixing the flexible printed circuit board 160 to the light guide plate 120, a position of the LED 150 is adjusted with respect to the light incident surface 125.

Projecting portions 220 are formed on the light guide plate 120 for ensuring a large adhesive area between the flexible printed circuit board 160 and the light guide plate 120 by way of the adhesive sheet. The projecting portions 220 are formed on a light-incident-surface-125 side of the light guide plate 120 in a state that each LED 150 is sandwiched between the projecting portions 220. By adhering the projecting portions 220 and the flexible printed circuit board 160 to each other, the relative position of the LEDs 150 with respect to the light guide plate 120 can be adjusted with high accuracy.

Next, light 131 emitted from the LED 150 is explained in conjunction with FIG. 3B. The light 131 emitted from the LED 150 is incident on the light guide plate 120 from the light incident surface 125. A refractive index of the light guide plate 120 is larger than a refractive index of air and hence, light which reaches the light incident surface 125 at an angle larger than a specified angle with respect to the direction perpendicular to the light incident surface 125 is reflected on the light incident surface 125, while light which reaches the light incident surface 125 at an angle smaller than the specified angle with respect to the direction perpendicular to the light incident surface 125 enters the inside of the light guide plate 120.

The upper surface 121 and the lower surface 122 of the light guide plate 120 are arranged to be substantially orthogonal to the light incident surface 125, and the light which enters the inside of the light guide plate 120 advances in the inside of the light guide plate 120 while repeating the total reflection between the upper surface 121 and the lower surface 122 of the light guide plate 120. Grooves 126 having a V-shaped cross section are formed in the lower surface 122 as reflection portions. A part of the light which advances through the light guide plate 120 is reflected toward the upper-surface-121 side on the grooves 126 formed in the lower surface 122, and is radiated from the upper surface 121. Here, the explanation is made with respect to a case in which the reflection portion is formed of the grooves 126 having a V-shaped cross section as one example. However, any reflection portion may be used provided that the reflection portion has a function of directing the light which advances in the inside of the light guide plate toward the upper-surface-121 side. For example, white dots formed by printing or the like may be used as the reflection portions.

Figure 4A:
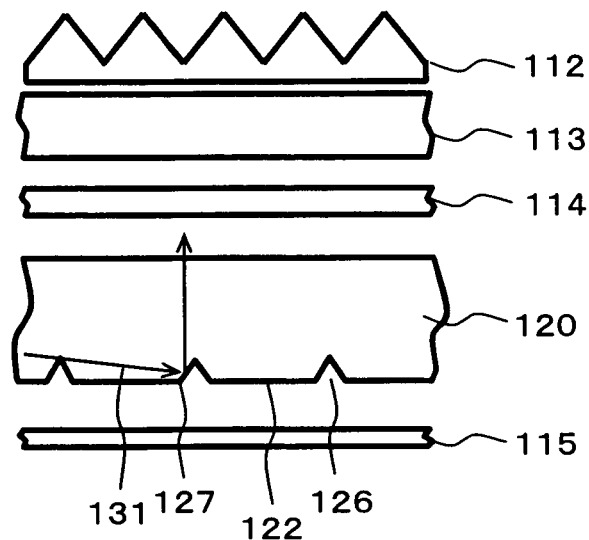
FIG. 4A and FIG. 4B are schematic cross-sectional views showing the light guide plate of the liquid crystal display device of the embodiment according to the present invention.
Figure 4B:
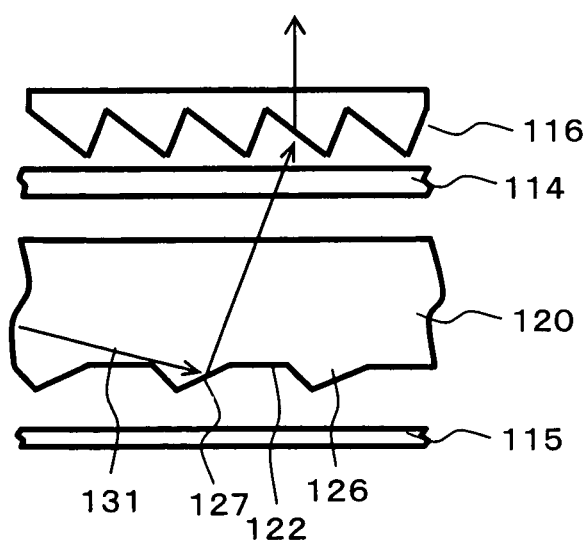

Next, the light which is reflected on the grooves 126 is explained in conjunction with FIG. 4A and FIG. 4B. FIG. 4A shows a case in which the grooves 126 are recessed inwardly, while FIG. 4B shows a case in which the grooves 126 project outwardly. Each groove 126 includes a reflection surface (also referred to as an inclined surface) 127, wherein the reflection surface 127 makes an angle of 1 to 35 degrees with respect to the lower surface 122. The light which is reflected on the reflection surface 127 is reflected toward the upper surface 121 of the light guide plate 120. By reflecting the light on the reflection surface 127, it is possible to set an angle of light with respect to the upper surface 121 to an angle which allows the light to be radiated from the upper surface 121. That is, although the light repeats the total reflection in the inside of the light guide plate 120 as described above, due to the formation of the reflection surfaces 127, the angle of the light with respect to the upper surface 121 becomes an angle which allows the radiation of light from the light guide plate 120.

As shown in FIG. 4A, prism sheets 112, 113 are arranged on the upper surface 121 of the light guide plate 120 so as to control the direction of light radiated from the light guide plate 120. Here, in FIG. 4A, the prism sheets 112, 113 are arranged in a state that ridges of triangular columns of the prism sheet 112 and ridges of triangular columns of the prism sheet 113 intersect with each other. Accordingly, the prism sheet 113 can refract the advancing direction of light which is radiated from the light guide plate 120 in the lateral direction thus directing the light toward the inside (liquid-crystal-panel side). Here, numeral 114 indicates a diffusion plate, and numeral 115 indicates a reflection sheet.

Next, FIG. 4B shows a case in which one sheet of asymmetric prism sheet is used. The light which is reflected on the reflection surface 127 makes an obtuse angle with respect to the perpendicular direction of the upper surface 121, and the light is radiated from the upper surface 121 such that the light expands outwardly (toward a right side in the drawing). On the light guide plate 120, an asymmetrical prism sheet 116 is formed so as to refract the outgoing light toward a liquid-crystal-panel (not shown in the drawing) side.

Figure 5:
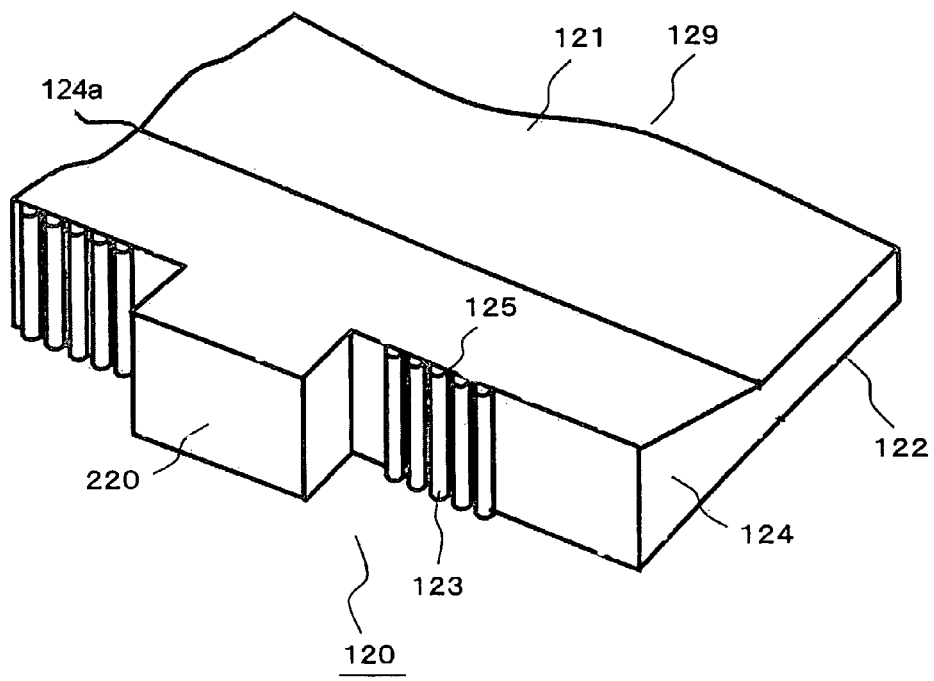
FIG. 5 is a schematic cross-sectional view showing the vicinity of a light incident surface of the light guide plate of the liquid crystal display device of the embodiment according to the present invention.

FIG. 5 is a perspective view showing the vicinity of the light incident surface 125 of the light guide plate 120. Lenses 123 are formed on the light incident surface 125 of the light guide plate 120. The lenses 123 have a function of scattering light incident from the light incident surface 125. The light incident from the light incident surface 125 is guided to the light radiation surface 121 by way of the inclined portion 128. A projecting portion 220 is formed between the neighboring lenses 123 in a state that the projecting portion 220 projects from the light incident surface 125. The light incident portion 124 is formed of the projecting portions 220, the light incident surface 125, the lenses 123, the inclined portion 128 and the like. A boundary surface 124a exists between the light incident portion 124 and a light radiation portion 129 due to the manufacturing method of the respective portions as will be discussed below.

When the light guide plate 120 is made thin, a thickness of the LED 150 becomes larger than a thickness of the light guide plate 120 defined between the upper surface 121 and the lower surface 122. Accordingly, a thickness of the light guide plate 120 at the light incident surface 125 is set large so as to form the inclined portion 128 thus enabling guiding of the light toward the upper-surface-121 side.

The light is radiated toward a liquid-crystal-panel side from the upper surface 121. A portion of the light guide plate 120 from which the light is radiated toward the liquid crystal panel is referred to as a light radiation portion 129. To satisfy a demand for further reduction of a thickness of the light guide plate 120, a thickness of the light guide plate 120 at the light radiation portion 129 is steadily reduced. However, when a distance between the upper surface 121 and the lower surface 122 becomes 1 mm or less, it becomes difficult to manufacture the light guide plate 120 by injection molding.

Figure 6:
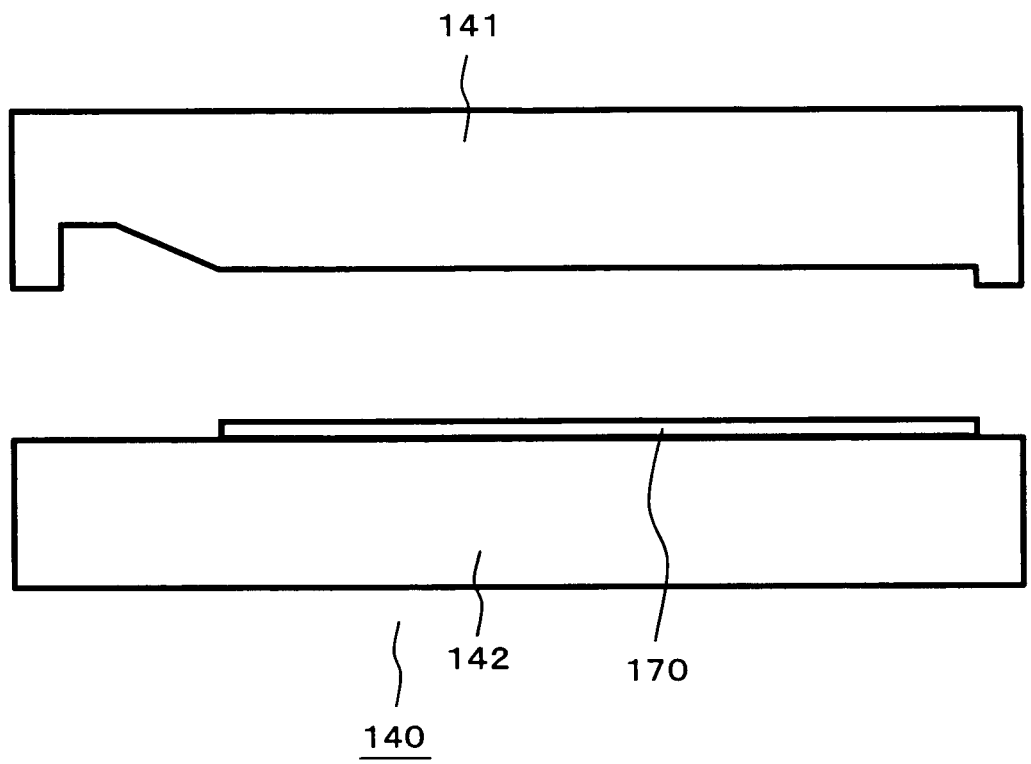
FIG. 6 is a schematic cross-sectional view showing a mold for forming the light guide plate of the liquid crystal display device of the embodiment according to the present invention by molding.

Accordingly, in this embodiment, the light radiation portion 129 is manufactured using a sheet-shaped resin. FIG. 6 shows a state in which the sheet-shaped resin 170 is arranged on a mold 140. Before being formed by the mold, the sheet-shaped resin 170 is not provided with the constitution necessary for forming the light guide plate 120 such as the above-mentioned grooves 126.

As the sheet-shaped resin 170, various kinds of synthetic resins in a sheet shape may be used including an acrylic resin, an ABS resin, an SAN resin, a polycarbonate resin or the like in a sheet shape.

Figure 7:
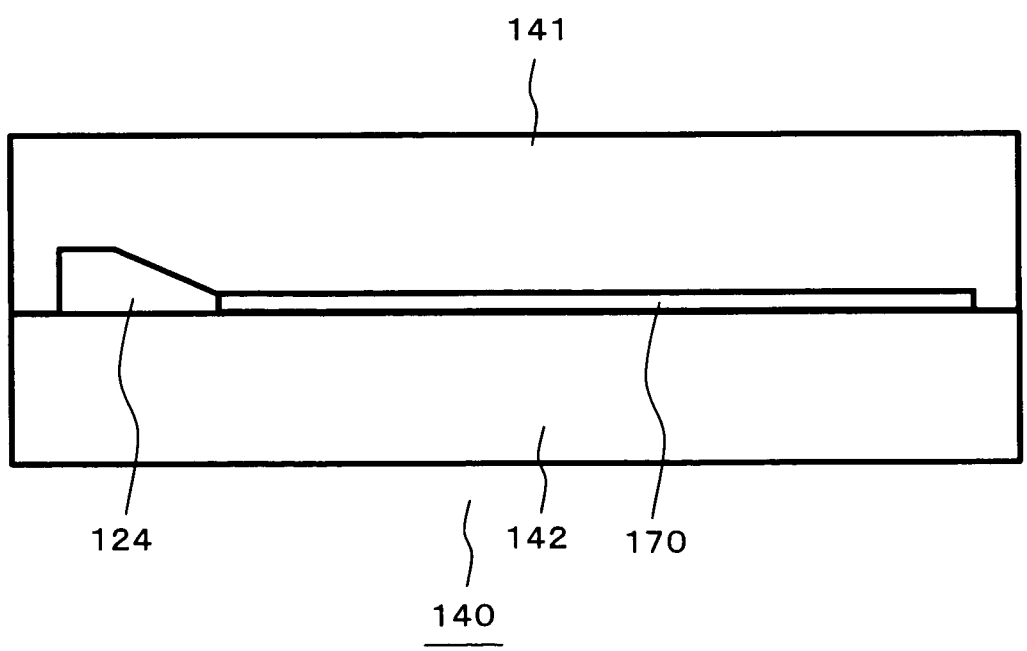
FIG. 7 is a schematic cross-sectional view showing the mold for forming the light guide plate of the liquid crystal display device of the embodiment according to the present invention by molding.

As shown in FIG. 7, the sheet-shaped resin 170 is sandwiched between a mold lower portion 142 and a mold upper portion 141, and sheet-shaped resin 170 is molded by applying pressure and heat to the sheet-shaped resin 170 thus forming the grooves 126 and the like on the light-guide plate 120.

Here, the sheet-shaped resin 170 is not arranged at a position of the light incident portion 124. As described previously, the light incident portion 124 is required to have a complicated shape formed by the projecting portions 220, the lenses 123, the inclined surfaces 128 and the like and a fixed thickness and hence, the light incident portion 124 is formed by injection molding using a resin.

Figure 8:
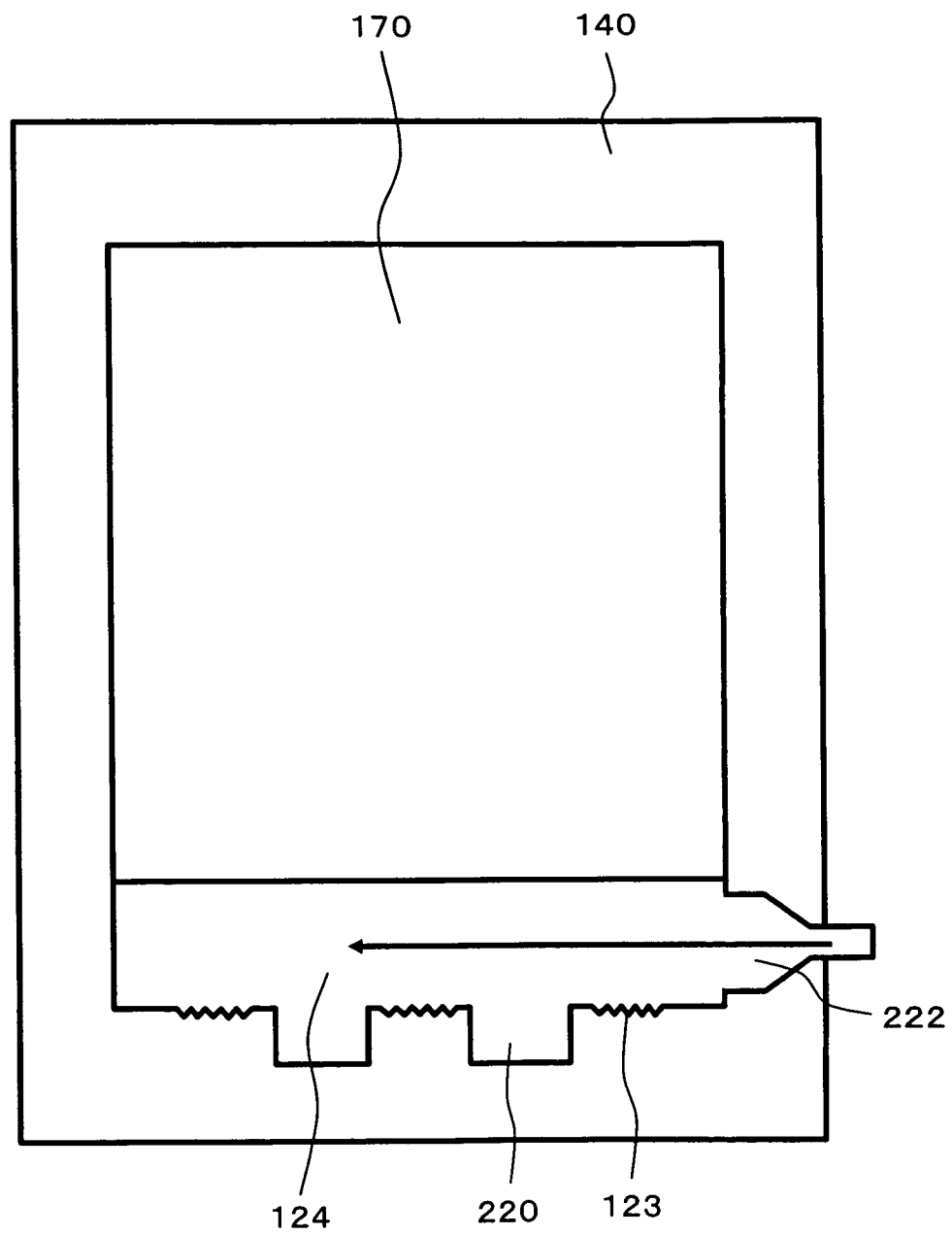
FIG. 8 is a schematic plan view showing a state of forming the light guide plate of the liquid crystal display device of the embodiment according to the present invention by injection molding a resin.

FIG. 8 shows a state of molding the resin by injection molding. A gate 222 is formed in a side surface of the light guide plate 120 such that the gate 222 is brought into contact with the light incident portion 124. The resin is injected into the light incident portion 124 from the gate 222 in the direction indicated by an arrow. The resin is uniformly filled in the lenses 123, the projecting portions 220 formed on the light incident portion 124. Although only one gate 222 is shown in FIG. 8, two gates may be formed on left and right side surfaces of the mold 140 respectively in the drawing.

Figure 9:
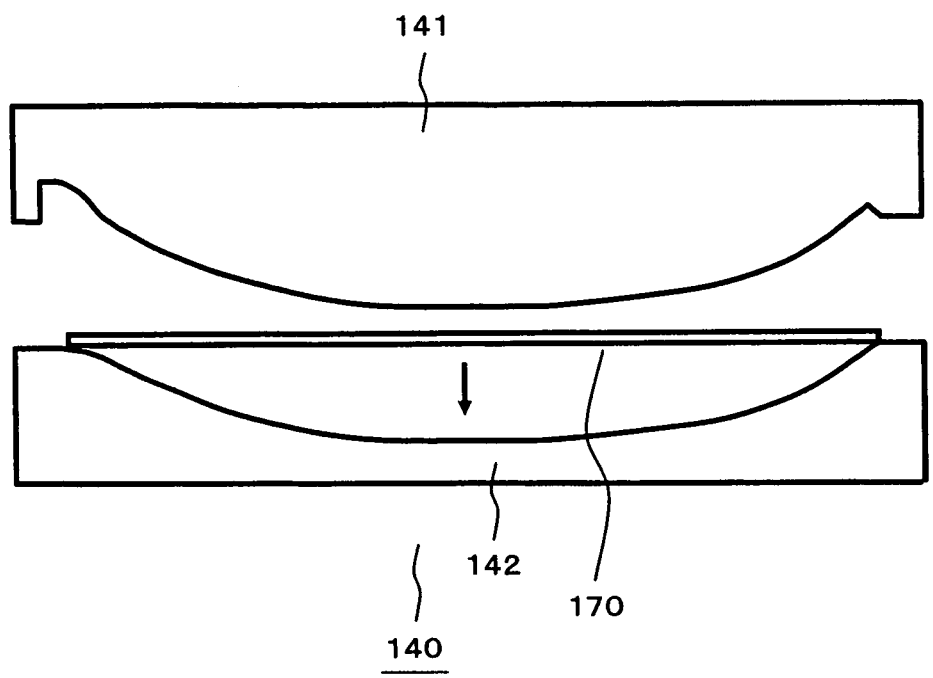
FIG. 9 is a schematic cross-sectional view showing the mold for forming the light guide plate of the liquid crystal display device of the embodiment according to the present invention by molding.
Figure 10:
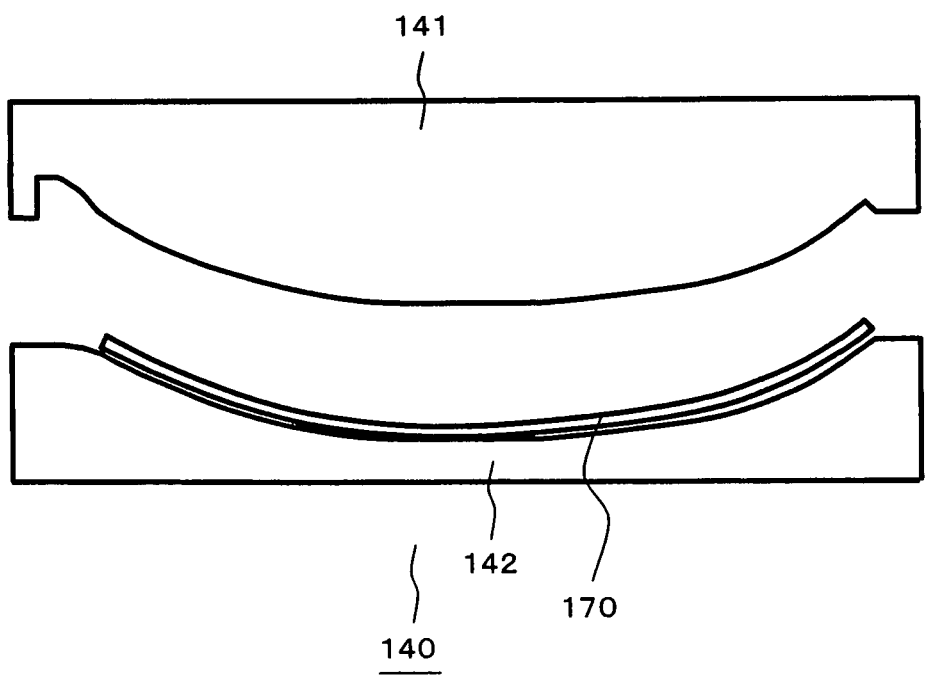
FIG. 10 is a schematic plan view showing the mold for forming the light guide plate of the liquid crystal display device of the embodiment according to the present invention by molding.
Figure 11:
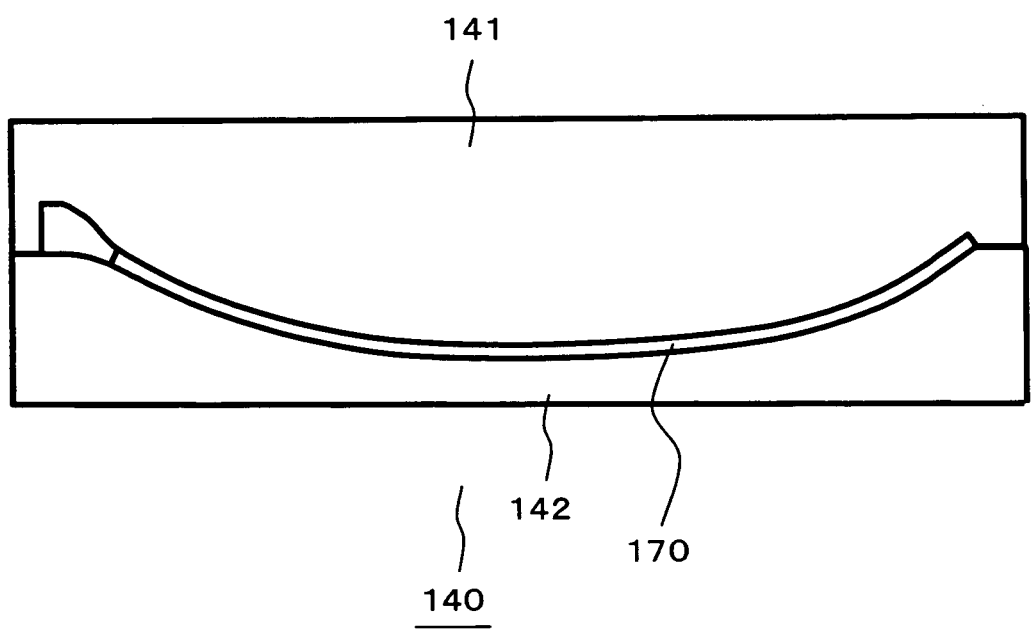
FIG. 11 is a schematic plan view showing the mold for forming the light guide plate of the liquid crystal display device of the embodiment according to the present invention by molding.

Next, a manufacturing method of the light guide plate 120 in which the light radiation portion 129 is formed in a curved surface is explained in conjunction with FIG. 9 to FIG. 11. As shown in FIG. 9, the mold upper portion 141 and the mold lower portion 142 having a curved surface respectively are prepared, and the sheet-shaped resin 170 is arranged between the mold upper portion 141 and the mold lower portion 142.

When the sheet-shaped resin 170 is flexible, the sheet-shaped resin 170 is deflected in the direction indicated by an arrow due to deadweight thereof, and as shown in FIG. 10, the sheet-shaped resin 170 is curved along a curved surface of the mold lower portion 142.

Next, as shown in FIG. 11, the mold upper portion 141 is pressed to the mold lower portion 142, and the sheet-shaped resin 170 is molded by applying pressure and heat to the sheet-shaped resin 170. Further, due to the application of pressure and heat to the sheet-shaped resin 170, the sheet-shaped resin 170 is formed into a curved shape along the curved surfaces of the molds along with the formation of the light guide plate 120.

After forming the curved surface on the sheet-shaped resin 170 by applying pressure and heat to the mold 140, the light incident portion 124 is formed by injection molding using a resin. This light guide plate 120 having the curved surface is effectively used as the light guide plate 120 of the backlight when a liquid crystal panel has a curved surface.

Figure 12:
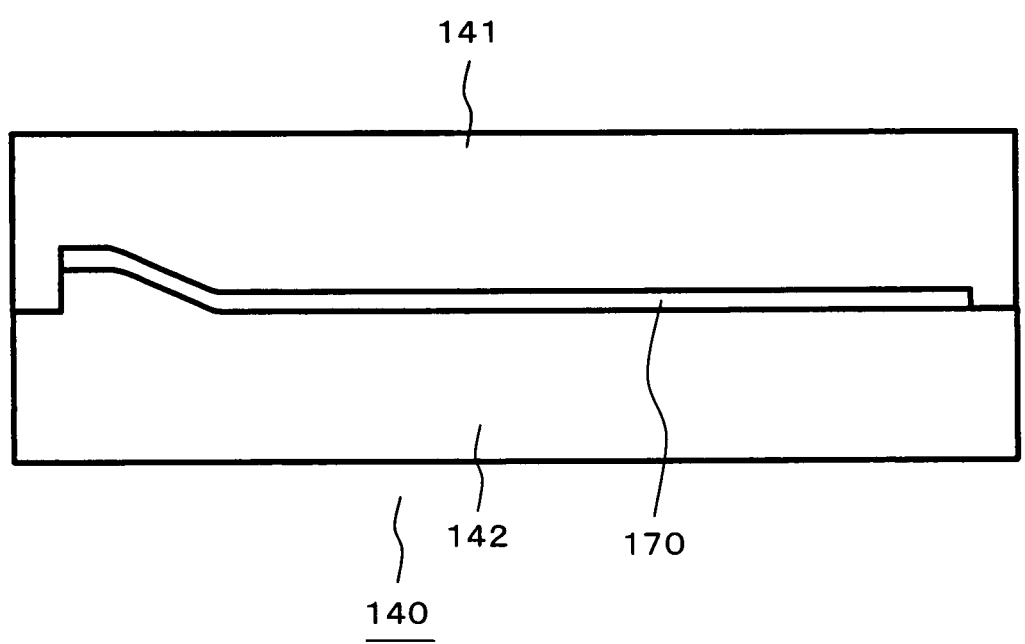
FIG. 12 is a schematic plan view showing the mold for forming the light guide plate of the liquid crystal display device of the embodiment according to the present invention by molding.
Figure 13:
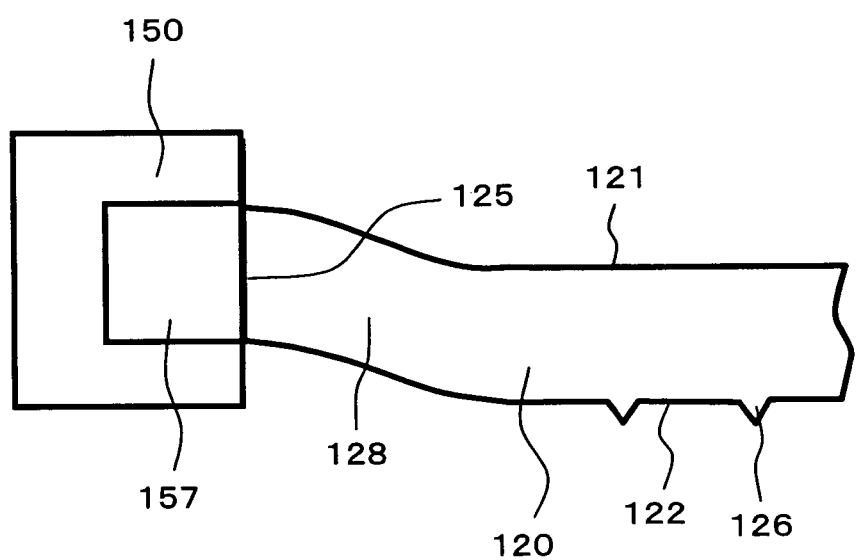
FIG. 13 is a schematic cross-sectional view showing a light incident portion of the light guide plate of the liquid crystal display device of the embodiment according to the present invention.

Next, FIG. 12 shows the mold 140 which is used for bending the light incident portion 124 in an S shape. As shown in FIG. 13, the light incident portion 124 of the light guide plate 120 is bent in an S shape. In this case, the sheet-shaped resin 170 is also arranged in the light incident portion 124 and hence, the light guide plate 120 ranging from the light incident portion 124 to the light radiation portion 129 can be formed with a fixed thickness using the sheet-shaped resin 170.

By bending the sheet-shaped resin 170 in an S shape as shown in FIG. 13, it is possible to set the thickness of the light guide plate 120 equal to a width of the light emitting portion 157 of the LED 150 in the vertical direction and hence, it is possible to allow the light emitted from the LED 150 to be effectively incident on and propagate through the light guide plate 120.

What is claimed is:
1. A liquid crystal display device, comprising:
a liquid crystal panel;
a backlight which radiates light to the liquid crystal panel;
a light emitting element mounted on the backlight; and
a light guide plate on which light from the light emitting element is incident,
the light guide comprising a light incident portion and a light radiation portion as discrete, independent parts, separately joined together via a joint, the light radiation portion having a thickness smaller than a thickness of the light incident portion,
projecting portions which project from a surface of the light incident portion:
wherein the light incident portion faces a light emitting surface of the light emitting element in an opposed manner and on which the light from the light emitting element is incident, and the light radiation portion being a portion of the light guide from which the incident light is radiated;
a joint surface is formed between the separate independent parts of the light incident portion and the light radiation portion along the joint;
the light incident portion and the light radiation portion are joined by the joint surface;
the light radiation portion includes grooves being recessed outwardly and a flat surface, the light radiation portion is made from a sheet-shaped resin;
the light incident portion is not formed to have a S-shape; and has an inclined surface extending upward from an upper surface of the light radiation portion,
lenses are formed on the light incident portion, and
the light radiation portion has two substantially parallel surfaces.

2. A liquid crystal display device according to claim 1, wherein a thickness of a side surface of the light emitting element is larger than a thickness of the light guide plate at the light radiation portion.

3. A liquid crystal display device according to claim 1, wherein the light incident portion includes a lens which makes the light emitted from the light emitting element diffused and incident on the light guide plate.

4. A liquid crystal display device according to claim 1, wherein the light incident portion is joined to the light radiation portion by fusing by joining a fused resin to a sheet-shaped light radiation surface of the light radiation portion.

5. A liquid crystal display device comprising:
a liquid crystal panel;
a backlight which radiates light to the liquid crystal panel;
a light guide plate mounted on the backlight;
a plurality of light emitting diodes arranged along a side surface of the light guide plate;
a lens which is mounted on a light incident surface of the light guide plate on which the light is incident from the light emitting diode;
projecting portions which project from the side surface of the light guide plate with the lens sandwiched there between;
a light radiation portion of the light guide plate, the light radiation portion having a thickness smaller than a thickness of the light emitting diode, the light radiation portion is made from a sheet-shaped resin;
a light incident portion of the light guide plate is formed by forming the light incident surface and the projecting portions by injection molding;
wherein the light incident portion and the light radiation portion are discrete, independent parts, separately joined together and fused via a joint, and
a joint surface is formed between the separate, independent parts of the light incident portion and the light radiation portion along the joint;
the light incident portion and the light radiation portion are connected by the joint surface;
wherein the light radiation portion includes grooves being recessed outwardly and a flat surface, and
the light incident portion is not formed to have an S-shape and has an inclined surface extending from an upper surface of the light radiation portion, and
the light radiation portion has two substantially parallel surfaces.

6. A liquid crystal display device according to claim 5, wherein a thickness of the light emitting diode is larger than a thickness of the light radiation surface of the light guide plate.

7. A liquid crystal display device according to claim 5, wherein the lens formed on the light incident surface is arranged between two neighboring projecting portions of the light guide plate.

8. A liquid crystal display device according to claim 5, wherein the light guide plate includes an inclined surface extending toward the light radiation surface from the light incident surface.

9. A liquid crystal display device according to claim 5, wherein the light incident portion is joined and fused to the light radiation surface by joining a molten resin to the sheet-shaped light radiation surface.

10. A liquid crystal display device comprising:
a liquid crystal panel; and
a planar lighting device which radiates light to the liquid crystal panel,
wherein
the planar lighting device includes a light guide plate having a light radiation surface and a bottom surface which faces the light radiation surface in an opposed manner;
the light guide plate includes side surfaces which intersect with the light radiation surface and the bottom surface;
a plurality of LEDs is arranged along a first side surface of the light guide plate,
the first side surface forms a light incident surface of the light guide plate by allowing light from the LEDs to be incident on the light guide plate from the first side surface;
projecting portions which project from the light incident surface of the light guide plate:
wherein the light incident surface and the light radiation surface are surfaces of two, independent parts, separately joined together;
the light incident on the light guide plate is directed toward a light-radiation-surface side by a scattering member mounted on the bottom surface of the light guide plate, and is radiated from the light radiation surface;
a thickness of the LEDs is set larger than a distance between the light radiation surface and the bottom surface of the light guide plate, wherein a thickness of the light incident surface is larger than the distance between the light radiation surface and the bottom surface of the light guide plate;
an inclined portion is formed between the light incident surface and the light radiation surface;
the inclined portion is joined to the light radiation surface by a joint along a joint surface;
the bottom surface includes grooves being recessed outwardly and a flat surface, and
the light incident portion is not formed to have a S-shape, and has an inclined surface,
the light radiation surface is made from a sheet-shaped resin and
the light radiation portion has two substantially parallel surfaces.

11. A liquid crystal display device according to claim 10, wherein columnar lenses are provided to the light incident surface.

12. A liquid crystal display device according to claim 10, wherein the inclined portion is joined to the light radiation surface by joining a molten resin to the sheet-shaped light radiation surface.

13. The liquid crystal display device of claim 1, wherein the light radiation portion and the light incident portion are composed of different material.

14. The liquid crystal display device of claim 5, wherein the light radiation portion and light incident portion are composed of different material.

15. The liquid crystal display device of claim 10, wherein the light radiation portion and the light incident portion are composed of different material.

* * * * *